United States Patent [19]

Kimura

[11] Patent Number: 5,136,595
[45] Date of Patent: Aug. 4, 1992

[54] MICROPROCESSOR OPERABLE IN A FUNCTIONAL REDUNDANCY MONITOR MODE

[75] Inventor: Shinya Kimura, Tokyo, Japan
[73] Assignee: NEC Corporation, Tokyo, Japan
[21] Appl. No.: 356,291
[22] Filed: May 24, 1989

[30] Foreign Application Priority Data

May 25, 1988 [JP] Japan .................................. 63-128844

[51] Int. Cl.[5] .......................................... G06F 11/00
[52] U.S. Cl. .................................. 371/68.3; 395/575;
364/264; 364/265; 364/266.4; 364/285;
364/949.3; 364/944.9
[58] Field of Search ... 364/200 MS File, 900 MS File;
371/9.1, 36, 68.3

[56] References Cited

U.S. PATENT DOCUMENTS

| | | | |
|---|---|---|---|
| 3,783,250 | 1/1974 | Fletcher et al. | 371/36 |
| 4,270,715 | 6/1981 | Norton et al. | 371/36 |
| 4,405,982 | 9/1983 | Ruhnau et al. | 364/200 |
| 4,405,983 | 9/1983 | Perez-Mendez | 364/200 |
| 4,497,059 | 1/1985 | Smith | 371/36 |
| 4,562,575 | 12/1985 | Townsend | 371/9.1 |

Primary Examiner—Stuart N. Hecker
Assistant Examiner—Rebecca L. Rudolph
Attorney, Agent, or Firm—Foley & Lardner

[57] ABSTRACT

A microprocessor system having a functional redundancy monitor operation mode. This processor system includes two processors, one processor to receive external signals from a monitored processor, and compare the external signals with signals generated internally every bus cycle. The monitoring processor then produces a comparison resultant signal, indicating if a match occurs. The processor further includes a timer circuit for defining a period during which the comparison resultant signal is output. After that period, the comparison result signal is set to a logic level representative of a misoperation of the processor monitored.

6 Claims, 6 Drawing Sheets

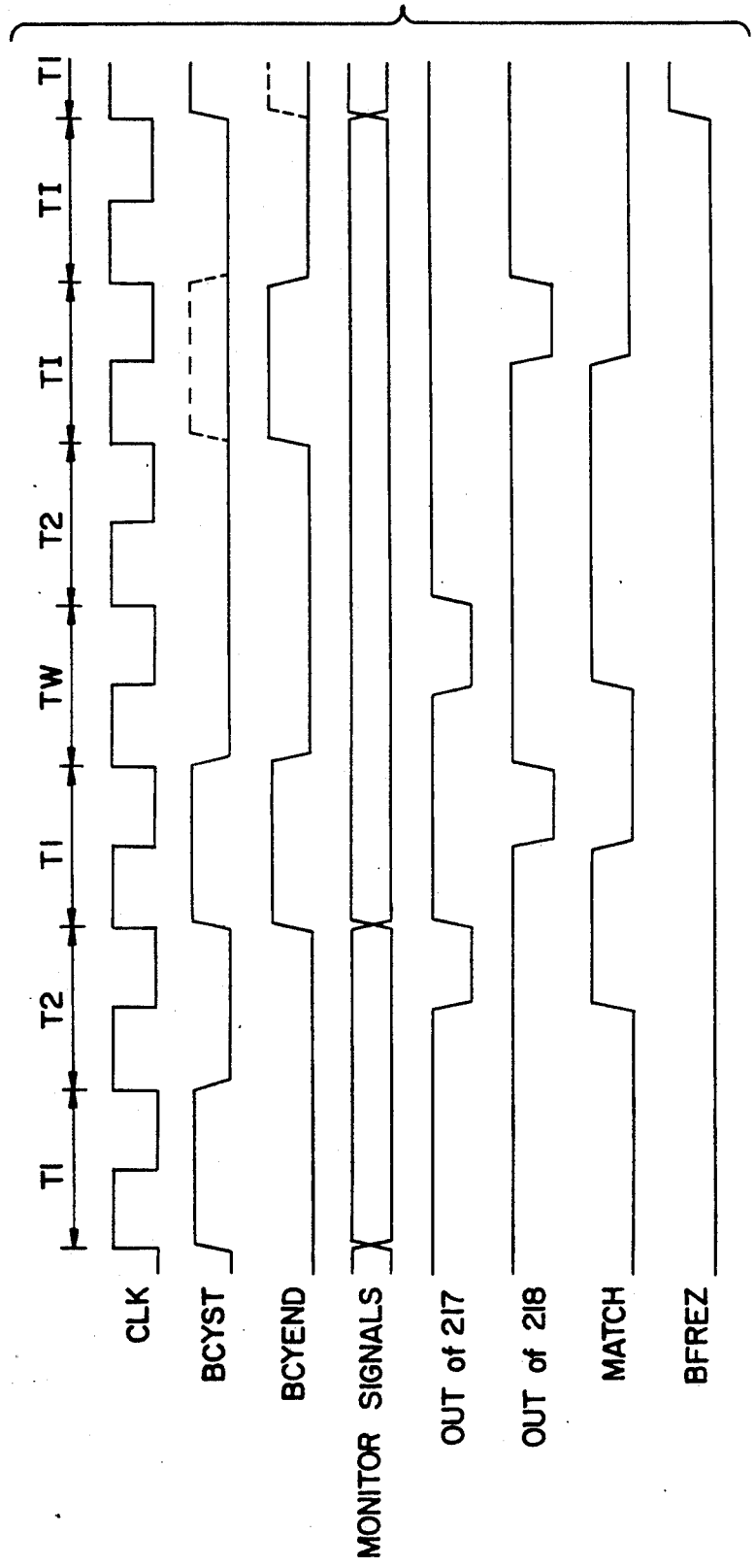

MICROPROCESSOR OPERABLE IN A FUNCTIONAL REDUNDANCY MONITOR MODE

BACKGROUND OF THE INVENTION

The present invention relates to a microprocessor and, more particularly, to a microprocessor operable in a functional redundancy monitor (called hereinafter "FRM") mode for supporting a multiple processor system.

As a microprocessor is progressed in performance and function, the application thereof extends to high reliability systems such as an electronic exchanger, an on-line terminal in a bank system, a medical apparatus, etc. For a high reliability system, a multiple processor structure is employed, which includes a microprocessor operating in a normal mode and another microprocessor operating in an FRM mode, these microprocessors being interconnected through address, data and control buses along with a system memory and various peripheral units to structure the multiple processor system.

The normal mode microprocessor operates as a control processing unit of the system. Namely, it drives the buses to output an address, fetches an instruction via the bus, executes the fetched instruction, and drives the buses to read or write operand data. On the other hand, the FRM mode microprocessor operates in synchronism with the normal mode microprocessor, but does not drive the buses. Namely, the FRM mode microprocessor simultaneously fetches the same instruction and operand data as those fetched by the normal mode microprocessor and executes the instruction. The FRM mode microprocessor also generates internally addresses for fetching the instruction and for reading and writing operand data and operand data to be written, but does not drive the buses by use of the internally generated addresses and operand data. Then, the FRM mode microprocessor compares the addresses and data generated by itself with those generated and outputted onto the buses by the normal mode microprocessor, and outputs to the external the comparison resultant as a match signal. This match signal takes one logic level when the addresses and data generated by the FRM mode microprocessor are coincident with those generated by the normal mode microprocessor to thereby inform that the normal mode microprocessor operates normally, but takes the other logic level when both of them are not coincident with each other to thereby inform that the normal mode microprocessor does not operate normally.

The FRM mode microprocessor carries out the above-mentioned comparison operation every time a bus cycle is started. The logic level of the match signal representative of the comparison resultant in a current bus cycle is held until a next bus cycle is started to obtain the comparison resultant in that cycle. For this reason, if the normal mode microprocessor operates abnormally during the idling period between the adjacent bus cycles or the period of the microprocessor having to be in the operation halt or stop state, the FRM mode microprocessor does not change the match signal to the logic level representative of the maloperation of the normal mode microprocessor during that period. The acknowledgement of the maloperation of the normal mode microprocessor is thereby delayed.

SUMMARY OF THE INVENTION

Therefore, an object of the present invention is to provide an improved microprocessor operable in an FRM mode.

Another object is to provide a microprocessor for supporting a multiple processor system in which it is possible to acknowledge a maloperation of a normal mode microprocessor during the above-mentioned period.

A microprocessor according to the present invention comprises a plurality of terminals to be coupled to another processor to receive external signals generated every bus cycle by the other processor, means for generating internal signals every bus cycle, means for comparing the external signals with the internal signals every bus cycle and for producing a comparison resultant signal after a predetermined time from the beginning of each bus cycle, means for producing an output enable signal during a predetermined period after the predetermined time, a match terminal, and means responsive to the output enable signal for outputting the comparison resultant signal to the match terminal during the predetermined period, wherein after the predetermined period the match terminal is changed to a logic level that represents that the external signals are not coincident with the internal signal.

During a bus idling state, the output enable signal is not generated, so that the match terminal is at that logic level. Therefore, if the processor to be monitored activates incorrectly during the bus idling state, the match terminal is at the logic level representative of the misoperation of the processor.

BRIEF DESCRIPTION OF THE DRAWINGS

The above and other objects, advantages and features of the present invention will be more apparent from the following description taken in conjunction with the accompanying drawings, in which:

FIG. 6 is a timing chart represent of an FRM operation of the circuit shown in FIG. 5.

DETAILED DESCRIPTION OF THE EMBODIMENTS

Figure 1:
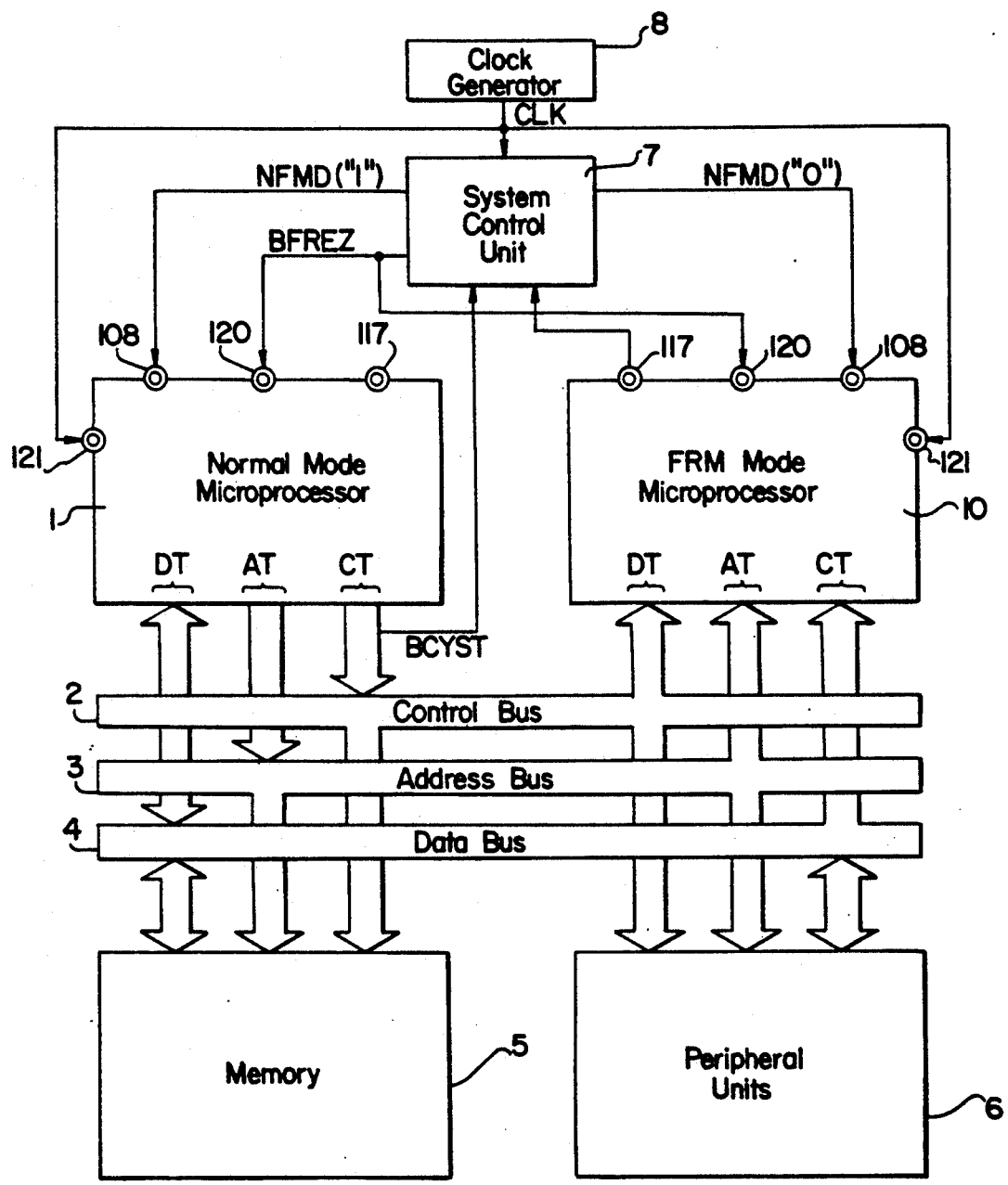
FIG. 1 is a block diagram representative of a multiple processor system employing microprocessors according to the present invention.

Referring to FIG. 1, a multiple processor system includes two processors 1 and 10 according to the present invention. These processors 1 and 10 have the same structure as each other, and thus each has a set of data terminals DT connected to a data bus 4, a set of address terminals AT connected to an address bus 3, a set of control terminals CT connected to a control bus 2, a clock terminal 121 supplied with a clock signal CLK from a clock generator 8, a mode designation terminal 108 supplied with an operation mode designation signal NFMD from a system control unit 7, a freeze terminal 120 supplied with an operation freeze signal BFREZ from the unit 7, and a match terminal 117 for outputting a match signal MATCH. Further connected to the control, address and data buses 2, 3 and 4 are a memory 5 and peripheral units 6. The memory 5 includes a string of instructions for a program to be executed and operand data. Since the processors 1 and 10 are designated to a normal operation mode and an FRM operation mode, respectively, the control unit 7 supplies the NFMD signal of logic "1" to the processor 1 and the NFMD signal of logic "0" to the processor 10. The MATCH signal derived from the terminal 117 of the processor 10 is supplied to the control unit 7, but the terminal 117 of the processor 1 has no connection. Since the processor 1 operates in the normal mode, one of the control signals derived from the control terminals CT thereof, a bus cycle start signal BCYST representative of the start of each bus cycle, is supplied to the control unit 7.

Figure 2:
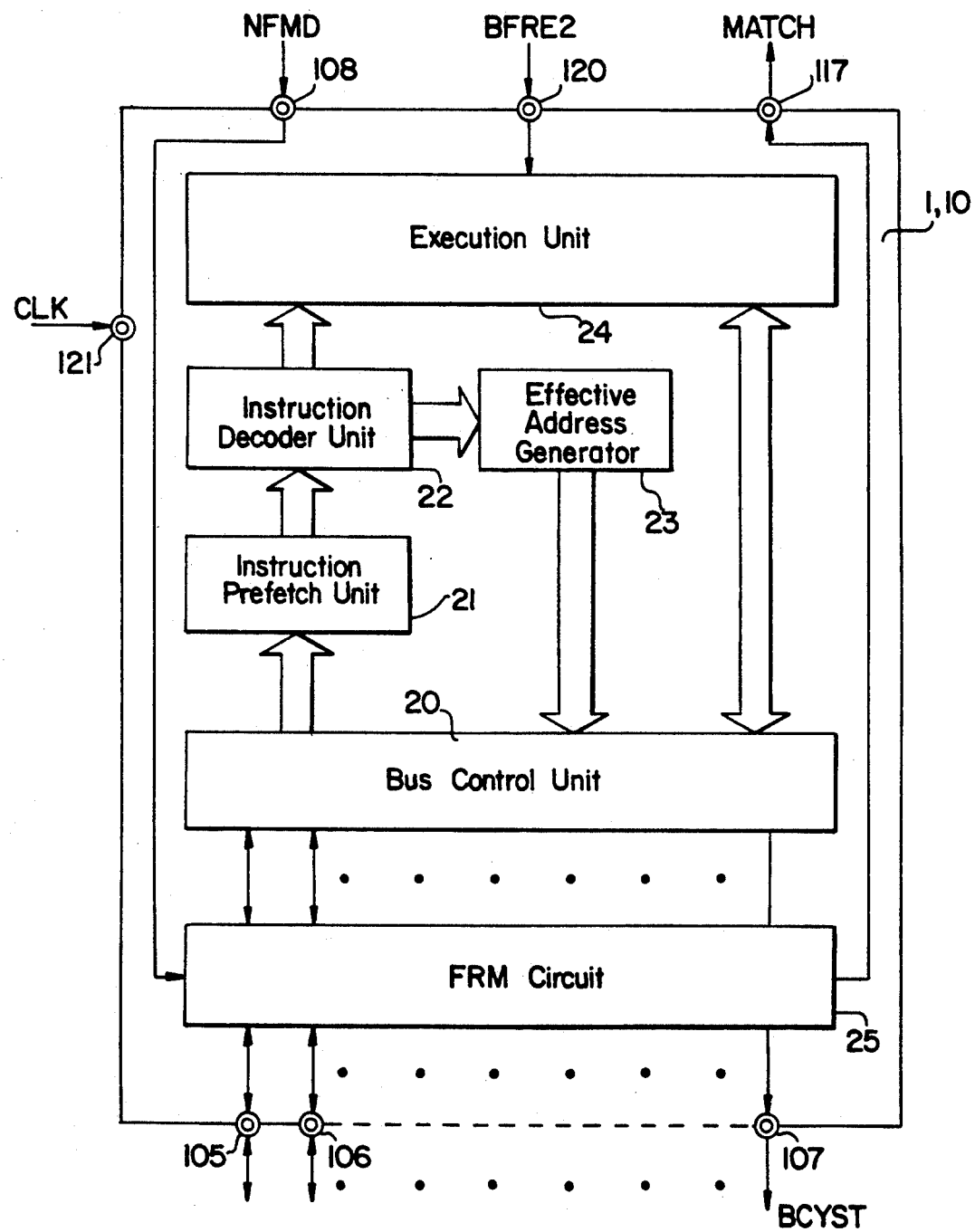
FIG. 2 is a block diagram representative of an internal construction of each of the microprocessor shown in FIG. 1.

Referring to FIG. 2, each of the processors 1 and 10 further has a bus control unit 20 driving the buses 2 to 4, an instruction prefetch unit 21 prefetching instructions, an instruction decoder unit 22 decoding the instruction from the unit 22, an effective address generator 23 calculating an effective address for operand data, and an execution unit 24 executing an instruction on the basis of the decoded signals from the unit 22, which are connected as shown. An FRM circuit 25 is connected between the bus control unit 20 and the control, address and data terminals CT, AT, DT including terminals 105 to 107. When the mode designation signal NFMD is at logic "1" to designate the normal operation mode, the FRM circuit 25 electrically connects the control signal output nodes, address signal output nodes and data input and output node of the bus control unit 20 to the corresponding the control, address and data terminals CT, AT and DT. On the other hand, in case where the logic "0" NFMD 108 is supplied to designate the FRM mode, the circuit 25 disconnects the control signal output nodes, the address signal output nodes and the data output nodes of the bus control unit 20 from the control, address and data terminals CT, AT and DT while connecting only the data input nodes of the unit 20 to the corresponding data terminals DT, and compares the information output from the bus control unit 20 and the information at the terminals CT, AT and DT. The comparison resultant signal produced by the circuit 25 is supplied to the terminal 117 and then output to the unit 7 as the MATCH signal.

Accordingly, the normal mode microprocessor 1 generates addresses for fetching an instruction and for reading or writing operand data, drives the buses 2 to 4 to fetch an instruction from the memory 5, executes the fetched instruction and drives the buses 2 to 4 to read or write operand data from or into the memory 5 or the peripheral units 6. The processor 1 thus operates as a central processing unit of the multiple processor system. On the other hand, the FRM mode microprocessor 10 generates addresses for fetching an instruction and for reading or writing operand data, fetches an instruction from the memory 5 and operand data from the memory 5 or the peripheral units 6 which are accessed by the normal mode processor 1, executes the fetched instruction and generates operand data to be written into the memory 5 or the pheripheral units 6. However, the FRM mode microprocessor 10 does not drive the buses 2 to 3 by use of the control signals, address signals and operand data generated by itself. It compares the control signals, address signals and operand data generated by itself with those generated by the normal mode processor 1 and supplied to the terminals CT, AT and DT via the buses 2 to 3 every time one bus cycle is activated.

Figure 3:
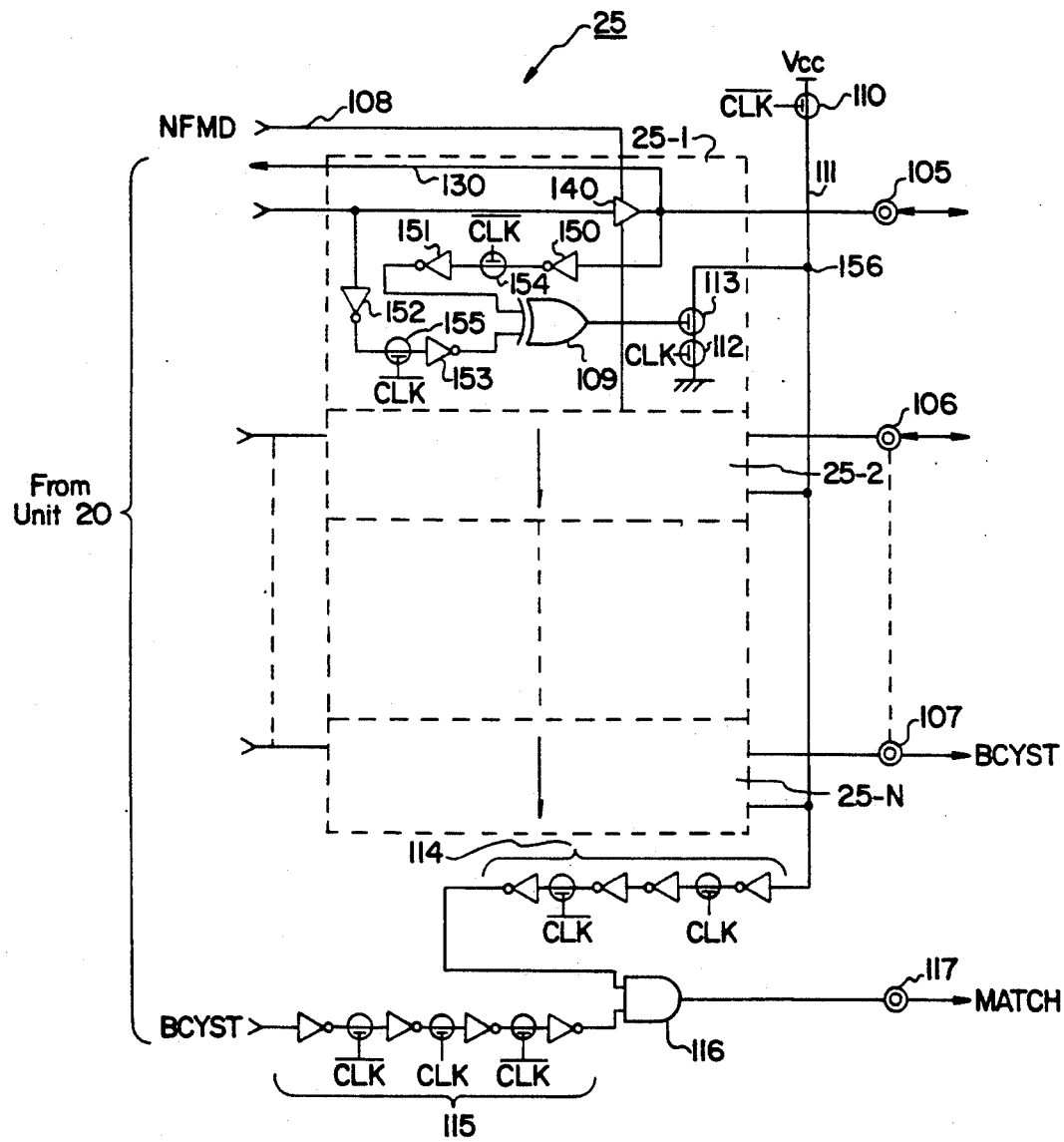
FIG. 3 is a circuit diagram representative of an embodiment of an FRM circuit shown in FIG. 2.

Turning to FIG. 3, the FRM circuit 25 includes a plurality of circuit units 25-1 to 25-N, each of which is provided for an individual one of the terminals to be monitored. Since each of the units 25-1 to 25-N has the same construction, only the unit 25-1 is shown in detail. The unit 25-1 includes a tri-state buffer 140 connected between the output node of the bus control unit 20 and the terminal 105 and controlled by the mode designation signal NFMD. This buffer 140 is activated by the logic "1" of the signal NFMD, so that the output signal from the bus control unit 20 is transferred to the terminal 25. On the other hand, the logic "0" of the signal NFMD brings the buffer 104 into a high impedance state, so that the output signal of the unit 20 is not transferred to the terminal 25. Since the terminal 25 is one of the data terminals DT, it is connected to the data input node (not shown) of the bus control unit 20 by a signal line 130. In case where the terminal to be monitored is one of the control and address terminals CT and AT, the line 130 is omitted. The terminal 105 is further connected to one input terminal of a 2-input exclusive OR (EX-OR) gate 109 via a series connection of an inverter 150, an N-channel MOS transistor 154 and an inverter 151, and the other input terminal of the EX-OR gate 109 is connected to the output node of the bus control unit 20 via a series connection of an inverter 152, an N-channel MOS transistor 155 and an inverter 153. The transistors 154 and 155 are supplied with an inverted signal $\overline{CLK}$ of the clock signal CLK. Thus, the EX-OR 109 compares the data signal generated internally with the data signal supplied to the terminal 105. The comparison resultant is supplied to an N-channel MOS transistor 113 which is in turn connected between an comparison output node 156 and a grand terminal via an N-channel MOS transistor 112 supplied with the clock signal CLK. The output nodes 156 of the units are connected in common to a coincident signal line 111 which is in turn to a power terminal Vcc via an N-channel MOS transistor 110 supplied with the inverted clock signal $\overline{CLK}$. Thus, the transistor 110 and those 112 and 113 in each unit constitute a dynamic AND gate which precharges the line 111 during the low level period of the clock signal CLK and samples each comparison resultant of the EX-OR gate 109 during the high level period of the clock signal $\overline{CLK}$. The transistor 110 may be replaced by a P-channel MOS transistor supplied with the clock signal CLK. Accordingly, when any one of the internally generated signals is not coincident with the corresponding one of the signals at the terminals to be monitored, the corresponding EX-OR gate 109 changes the line 111 to the low level. On the other hand, in case where all the internally generated signals are coincident with the respective ones of the signals at the terminals to be monitored, the line 111 is held at the high level. Since the line 111 has a large stray capacitance, a dynamic wave-shaping circuit 114 shapes the level change on the line 111. The circuit 114 includes four inverters and two transfer gates connected as shown. The output of the circuit 114 is connected to one input node of an AND gate 116 having the other input node supplied via a dynamic delay circuit 115 with the bus cycle start signal 115 which is generated by the unit 20 at the beginning of each bus cycle to inform the start of each bus cycle. The delay circuit 15 includes four inverters and three transfer gates connected as shown. The output of the AND gate 116 is connected to the terminal 117 and derived as the MATCH signal.

Next, circuit operation will be described below with reference to FIGS. 1 to 3 and FIG. 4 representative of a timing chart. In the present description, each bus cycle is constituted of two clocks represented by T1 and T2 states in FIG. 4. As described above, the normal mode processor 1 fetches an instruction from the memory 5 and executes the same, while the FRM mode processor 10 also fetches the same instruction and executes the same. Assuming that the instruction to be executed requires to write operand data into the memory 5, the processor 1 activates a bus cycle B1 for writing the operand data at a timing $t_1$ in synchronism with the leading edge of the clock signal CLK. That is, the processor 1 changes the bus cycle start signal BCYST to the high level and drives the control, address and data buses by use of the remaining control signals, address signals and operand data signals. These control, address and operand data signals are transferred to the memory 5 and further to the FRM mode processor 10 via the buses 2, 3 and 4. The high level of the signal BCYST is held during the T1 state period. Since the FRM mode processor 10 executes the same instruction, it also generates internally the bus cycle start signal BCYST, other control signals, address signals and operand data signals. Each of the EX-OR gates 109 compares one of these internally generated signals with the corresponding one of the signals generated by the processor 1 and supplied to the terminals DT, AT and CT of the processor 10 during the low level period of the T1 state. During this period, the line 111 is precharged to the high level by the transistor 110. The comparison resultants derived from the EX-OR gates are sampled by the dynamic AND gate including the transistors 110, 112 and 113 during the high level period of the T2 state. The output of the dynamic AND gate is supplied to the circuit 114, so that the output of the circuit 114, i.e. The signal representing whether or not the normal mode processor 1 operates correctly, appears in synchronism with the fall edge (timing $t_2$) of the clock CLK in the T2 state. In other words, the data comparison part including units 25-1 to 25-N, the transistor 110, the line 111 and the circuit 114 requires one and a half clock times to perform the data comparison from the beginning of the bus cycle. Assuming that all the signals generated by the processors 1 and 10 are coincident with one another, the output of the circuit 114 takes the high level. This high level is maintained during one clock period. On the other hand, the bus cycle start signal BCYST is delayed by the dynamic delay circuit 115 by one and a half clock times. Namely, the circuit 115 change its output to the high level at the timing $t_2$ and holds that level during one clock period. Thus, the AND gate 116 is made open at the timing $t_2$ and the open state thereof is maintained during one clock period. As the result, the output of the circuit 114 is transferred onto the terminal 117 at the timing $t_2$ as the MATCH signal. Since the MATCH signal at this time is at the high level, it represents the processor 1 operates correctly. After one clock period, the AND gate 16 is closed to change the MATCH signal to the low level at a timing $t_4$. The low level of the MATCH signal represents that the processor 1 operates incorrectly. The MATCH signal outputted by the FRM mode processor 10 is supplied to the system control unit 7 which are further supplied with the bus cycle start signal BCYST generated by the normal mode processor 1. The control unit 7 delays the bus cycle start signal BCYST by one clock and detects the level of the MATCH signals in synchronism with the falling edge of the delayed signal BCYST. Since the MATCH signal is detected to be the high level, the unit 7 judges the microprocessor 1 operates correctly. If the MATCH signal is detected to be the low level, the unit 7 changes the operation freeze signal BFREZ to the active level, so that the operations of the processors 1 and 10 are freezed at this timing. The unit 7 gives an alarm or commands the processors 1 and 10 to reexecute the processing operation.

A next bus cycle B2 is started at a timing $t_3$ continuously with the preceding bus cycle. Assuming that all the signals generated by the processors 1 and 10 are coincident with one another, the MATCH signal is changed to the high level at a timing $t_5$ and returned to the low level at a timing $t_6$.

Figure 4:
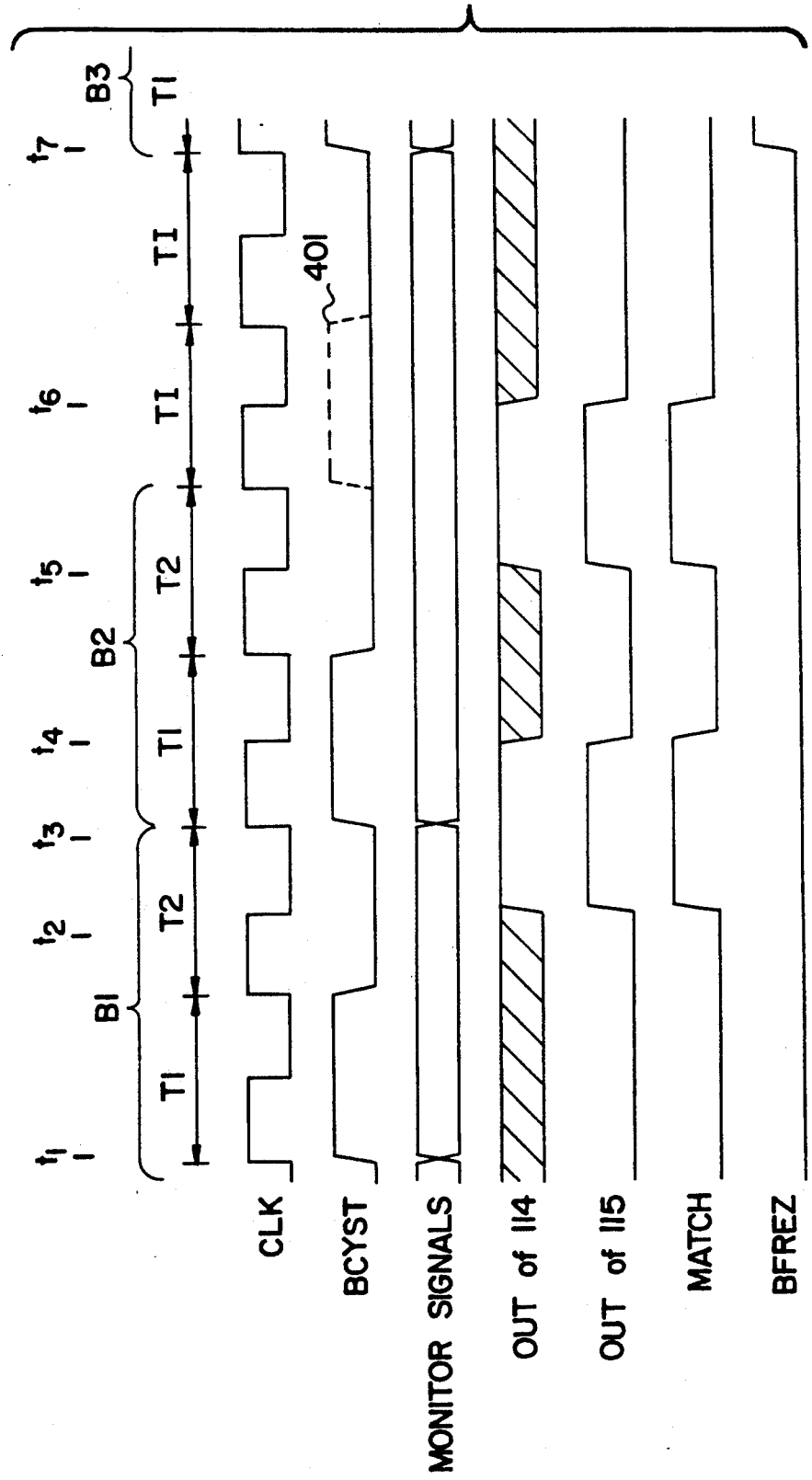
FIG. 4 is a timing chart representative of an FRM operation of the circuit shown in FIG. 3.

In a correct operation, a further next bus cycle B3 is not activated continuously with the preceding bus cycle B2, but is activated after two clocks represented as an idling state TI. In the idling state TI, therefore, the bus cycle start signal BCYST is not generated and the buses 2 to 4 are not driven by the processor 1. Assuming now that the processor 1 activates incorrectly the bus cycle in the idling state TI, the bus cycle start signal BCYST is generated by the proccessor 1, as shown in FIG. 4 by a dotted line 401. On the other hand, the FRM mode processor 10 does not generate internally the bus cycle start signal BCYST, so that the AND gate 116 is maintained in the closed state. The MATCH signal is thereby at the low level. The bus cycle start signal BCYST generated by the normal mode processor 1 is supplied to the control unit 7. Therefore, the unit 7 delays the supplied signal BCYST by one clock and detects the level of the MATCH signal at the falling edge of the delayed signal BCYST. Since the MATCH signal is detected to be the low level, the operation freeze signal BFREZ is generated at a timing $t_7$. Thus, the immediate acknowledgement of the misoperation of the normal mode processor 1 is carried out not only during the bus cycle period, but also during the bus idling period.

Figure 5:
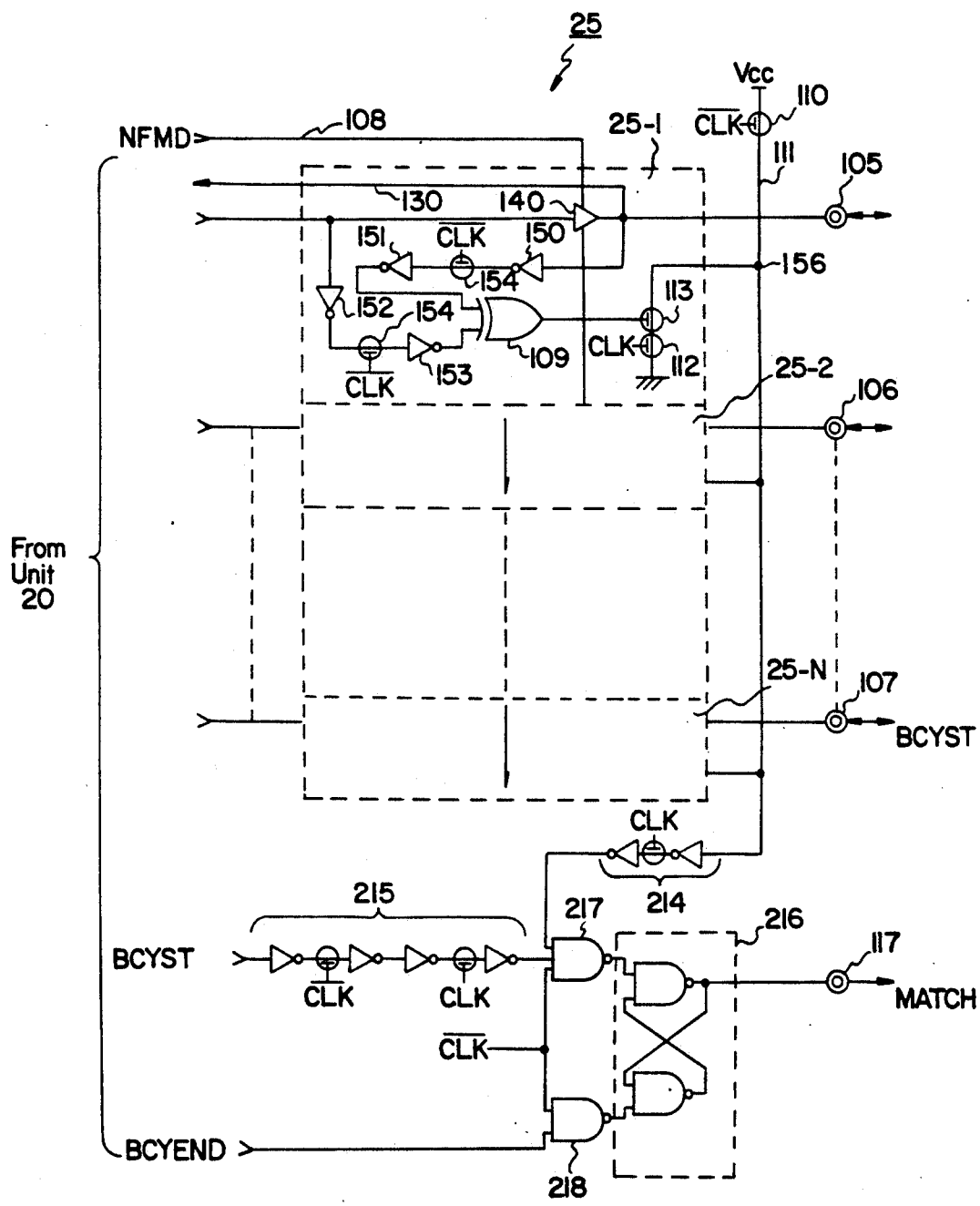
FIG. 5 is a circuit diagram representative of another embodiment of the FRM circuit shown in FIG. 2.

Referring to FIG. 5, there is shown a FRM circuit according to another embodiment of the present invention, in which the same constituents as those shown in FIG. 3 are denoted by the same reference remurals to omit further description thereof. In FIG. 5, a circuit portion including a circuit 24 consisting of two inverters and one transfer gate, a dynamic delay circuit 215 consisting of four inverters and two transfer gates, and a 3-input NAND gate has the same function as the circuit part consisting of the circuits 114 and 116 and the AND gate 116 shown in FIG. 3, and thus produces the comparison resultant signal after one and a half clock times from the start timing point of each bus cycle. This comparison resultant signal sets an S-R flip-flop 216 consisting of two NAND gates. The set output thereof is supplied to the terminal 117 and derived as the MATCH signal. A signal BCYEND is generated by the bus control unit 20 and represents the end of each bus cycle. This signal BCYEND resets the flip-flop 216 to change the MATCH signal to the low level.

The timing chart representative of an operation of this circuit is shown in FIG. 6. Also in the present embodiment, each bus cycle is constituted basically by two clocks represented by T1 and T2 states. However one or more clocks can be inserted between T1 and T2 states as a wait state TW to enable access to a low speed memory and/or peripheral units. The bus cycle end signal BCYEND may be used as a sampling signal to be supplied to the control unit 7 in place of the bus cycle start signal BCYST. In this case, the unit 7 detects the level of the MATCH signal in response to the leading edge of the bus cycle end signal BCYEND. Therefore, this circuit also acknowledges immediately the misoperation of the normal mode processor 1 not only during the bus cycle period, but also bus idling period.

The present invention is not limited to the above embodiments, but may be changed and modified without departing from the scope and spirit of the invention.

What is claimed is:

1. A redundancy microprocessor for monitoring operation of a normal microprocessor, said redundancy and normal microprocessors being coupled to each other via a bus to which a memory storing instructions for a program is further coupled, said normal microprocessor accessing said memory to read an instruction from said memory and initiating a bus cycle to transmit onto said bus external signals for executing a read instruction, said redundancy microprocessor comprising:
   (a) a plurality of terminals coupled to said normal microprocessor via said bus to receive said external signals generated by said normal microprocessor;
   (b) executing means supplied with said instruction read from said memory for initiating an internal bus cycle to generate internal signals for executing an instruction equivalent to said instruction executed by said normal microprocessor;
   (c) means coupled to said terminals and to said executing means for comparing said external signals with said internal signals in response to initiation of said internal bus cycle and for producing a comparison resultant signal;
   (d) means for producing a bus cycle start pulse signal representative of a start of said internal bus cycle;
   (e) means for delaying said bus cycle start pulse signal to produce a delayed pulse signal;
   (f) a comparison resultant output terminal;
   (g) transferring means for transferring said comparison resultant signal to said comparison resultant output terminal during a period of time when said delayed pulse signal is produced; and
   (h) means, coupled to said transferring means, for preventing said transferring means from transferring said comparison resultant signal to said comparison resultant output terminal after said period of time to thereby change said comparison resultant output terminal to a predetermined logic level indicating that said terminal to a predetermined logic level indicating that said external signals are not coincident with said internal signals.

2. A redundancy microprocessor for monitoring an operation of a normal microprocessor, said redundancy and normal microprocessors being coupled to each other via a bus to which a memory storing instructions is further coupled, said normal microprocessor accessing said memory to read an instruction from said memory and initiating a bus cycle to generate onto said bus external signals for executing a read instruction, said redundancy microprocessor comprising:
   (a) a plurality of terminals to be connected to said normal microprocessor via said bus to receive said external signals generated by said normal microprocessor;
   (b) means supplied with said instruction read from said memory for initiating an internal bus cycle to generate internal signals for executing an instruction equivalent to said instruction executed by said normal microprocessor;
   (c) means for producing a bus cycle start signal representative of a start of said internal bus cycle;
   (d) means for producing a bus cycle end signal representative of an end of said internal bus cycle;
   (e) means for comparing said external signals with said internal signals in response to initiation of said internal bus cycle and for producing a comparison resultant signal;
   (f) means for delaying said bus cycle start signal to produce a delayed signal;
   (g) a comparison resultant output terminal; and
   (h) means for outputting said comparison resultant signal to said comparison resultant output terminal in response to said delayed signal and for stopping outputting of said comparison resultant signal to said comparison resultant output terminal in response to said bus cycle end signal.

3. A microprocessor system using a functionally redundant mode (FRM mode) to check for errors, said microprocessor system comprising:
   (a) a first and second microprocessor each operable to function as a FRM mode microprocessor or as a normal mode microprocessor;
   (b) three busses including a control bus, an address bus, and a data bus, each of said three busses connected to said first and second microprocessors;
   (c) memory and peripheral units which are accessed via said busses by said first and second microprocessors; and
   (d) a system control unit generating a control signal which controls said first and second microprocessors such that said first microprocessor functions as a FRM mode microprocessor and said second microprocessor functions as a normal mode microprocessor, said normal mode microprocessor accessing said memory unit to read and fetch an instruction from said memory unit, an instruction read from said memory unit being further fetched by said FRM mode microprocessor, said normal mode microprocessor executing said instruction to transmit onto said busses signals for accessing said memory or peripheral units, said FRM mode microprocessor executing said instruction to generate inside said FRM mode microprocessor internal signals for accessing said memory or peripheral units, said FRM mode microprocessor including a comparator means for comparing said internal signals with said signals transmitted onto said busses by said normal mode microprocessor and for producing a comparison resultant signal indicative of a match or a mismatch in a one-shot pulse form, said system control unit receiving said comparison resultant signal from said FRM mode microprocessor indicating that said normal mode microprocessor and said FRM mode microprocessor generated matching signals, said system control unit outputting an operation freeze signal to said first and second microprocessors if a match does not occur.

4. A microprocessor system using a FRM mode to check for errors as claimed in claim 3, wherein said FRM mode microprocessor comprises:
   (a) means for disconnecting outputs from said FRM mode microprocessor to said three busses;

(b) means for comparing bus signals output from said normal mode microprocessor with signals generated by said FRM mode microprocessor and for generating a MATCH signal if they correspond; and (c) a delay circuit to delay said MATCH signal until a predetermined time in a bus cycle.

5. A microprocessor system using a FRM mode to check for errors as claimed in claim 3, wherein each of said first and second microprocessors comprise:

(a) a bus control unit which inputs and outputs data from said three busses;

(b) an instruction prefetch unit connected to said bus control unit for fetching signals from said bus control unit;

(c) an instruction decoder unit connected to said instruction prefetch unit to decode instructions from said instruction prefetch unit;

(d) an effective address generating calculator calculating an address from a decoded instruction and supplying an address to said bus control unit;

(e) an execution unit for executing said decoded instructions; and (f) a FRM mode circuit connecting said three busses and said bus control unit allowing signals to output from said three busses in a normal mode and preventing signals from outputting from said three busses in a FRM mode, and in said FRM mode determining if bus signals match internally generated signals.

6. A microprocessor system using a FRM mode to check for errors as claimed in claim 5, wherein said FRM mode circuit includes individual monitoring terminals each comprising:

(a) a tristate buffer controlled by said NFMD signal to allow said signals output from said three busses to pass from said bus control unit to said three busses;

(b) means for comparing a data signal generated internally with a supplied data signal from said normal mode microprocessor and for generating a MATCH signal to indicate whether data signals correspond; and (c) a delay circuit to delay said MATCH signal until a predetermined time in a bus cycle.

* * * * *